United States Patent [19]

Suzuki et al.

[11] Patent Number: 4,564,549
[45] Date of Patent: Jan. 14, 1986

[54] MAGNETIC RECORDING MEDIA AND PROCESS FOR FABRICATING THE SAME

[75] Inventors: Takashi Suzuki, Osaka; Koichi Shinohara, Hyogo; Masaru Odagiri, Hyogo; Takashi Fujita, Hyogo, all of Japan

[73] Assignee: Matsushita Electric Industrial Co., Ltd., Osaka, Japan

[21] Appl. No.: 657,056

[22] Filed: Oct. 3, 1984

Related U.S. Application Data

[63] Continuation of Ser. No. 575,480, Jan. 30, 1984, abandoned, which is a continuation of Ser. No. 293,147, Aug. 17, 1981, abandoned.

[30] Foreign Application Priority Data

Aug. 18, 1980 [JP] Japan ............................ 55-113898
Aug. 18, 1980 [JP] Japan ............................ 55-113904

[51] Int. Cl.⁴ ............................ B32B 3/00; G11B 5/70
[52] U.S. Cl. ............................ 428/141; 204/192 M; 427/128; 427/131; 427/132; 428/147; 428/152; 428/212; 428/694; 428/695; 428/900
[58] Field of Search ............ 428/900, 694, 695, 409, 428/141, 152, 147, 212; 427/131, 132, 130, 128; 204/192 M

[56] References Cited

U.S. PATENT DOCUMENTS

| | | | |
|---|---|---|---|
| 3,993,824 | 11/1976 | Shirabata et al. | 427/130 |
| 4,097,650 | 6/1978 | Shirabata et al. | 428/409 |
| 4,233,352 | 11/1980 | Ono et al. | 428/141 |
| 4,323,629 | 4/1982 | Kunieda | 428/457 |
| 4,489,117 | 12/1984 | Ono | 428/450 |
| 4,514,451 | 4/1985 | Suzuki | 428/141 |

Primary Examiner—Ellis P. Robinson
Attorney, Agent, or Firm—Burgess, Ryan & Wayne

[57] ABSTRACT

A thin film of a ferromagnetic metal or alloy and containing oxygen is formed over the surface of an elongated polyester film, said surface being formed with worm-like or particle-like projections consisting of cured high-molecular weight compounds.

5 Claims, 3 Drawing Figures

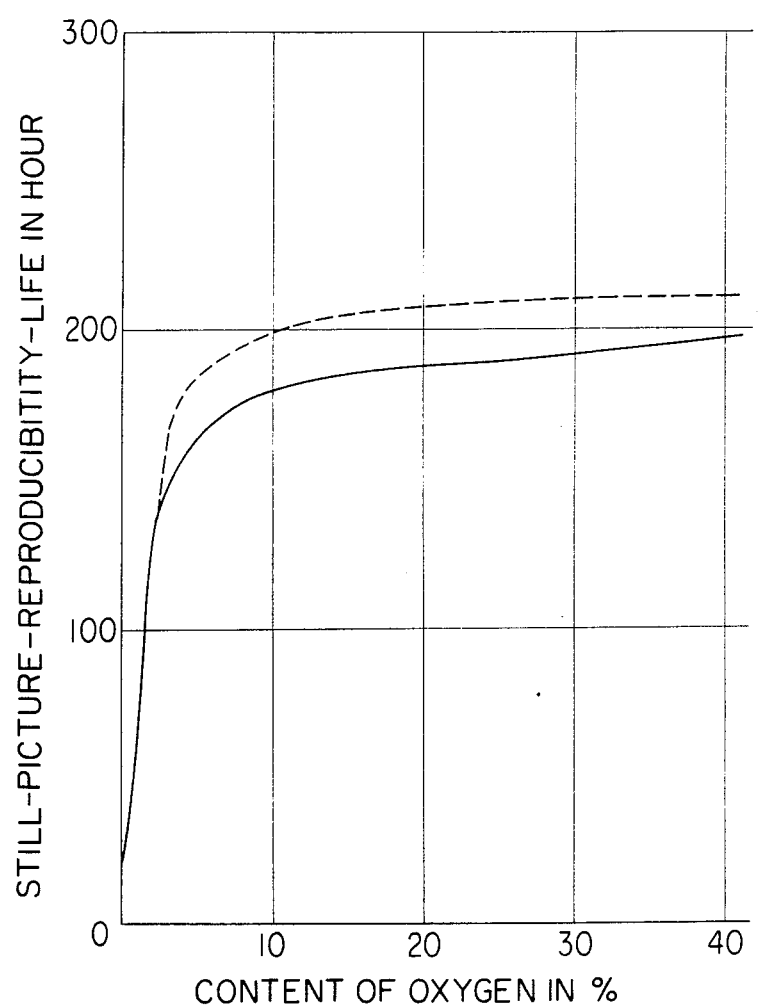

MAGNETIC RECORDING MEDIA AND PROCESS FOR FABRICATING THE SAME

This application is a continuation of application Ser. No. 575,480 filed Jan. 30, 1984 now abandoned, which is a continuation of application Ser. No. 293,147 filed Aug. 17, 1981 now abandoned.

BACKGROUND OF THE INVENTION

The present invention relates to a metal thin-film type magnetic recording medium and a process for fabricating the same.

Ferromagnetic thin-film type magnetic recording media are prepared by forming a thin film of iron, cobalt, nickel or an alloy thereof by a vacuum deposition, sputtering or electroplating method over the surface of a high-molecular weight compound film. Such magnetic recording media have an advantage in comparison with over coated type magnetic recording media prepared by applying over the surface of a base or substrate a mixture of ferromagnetic particles and a binder in that the former have a far higher recording density than the latter. However, there are differences in hardness, mechanical strength and thermal properties between magnetic thin films and bases or substrates which are made of high-molecular weight compounds in the case of the fabrication of magnetic tapes or flexible magnetic disks. Therefore, during the fabrication process or in use, if the magnetic tapes or disks are subjected to forces or thermal stresses in excess of their permissible limits, magnetic thin films are easily cracked. Once cracks have propagated, head-contactability; that is, a degree of capability of a magnetic tape or disk to contact a magnetic recording-and-reproducing head, is degraded depending upon the configurations of cracks. As a result, wear of the magnetic head is accelerated and the thin film itself is rapidly damaged. In the case of the home video tape recorder, a magnetic tape is wrapped around a cylinder and rotary heads are used to record or reproduce video and audio signals. In the still-picture reproduction mode, cracks tend to develop in the direction in which the rotary heads rotate. These cracks adversely affect "still-picture-reproducibility-life; that is, a life of a magnetic film during which still pictures can be satisfactorily reproduced.

In general, polyester films have been widely used as bases or substrates for the production of thin-film type magnetic recording media. In the preparation of such films, their surfaces are formed with extremely fine projections of residues or catalytic particles or specially added finely divided particles so that the lubricity; that is, the property to lessen friction, of the film surfaces can be improved. When a thin film of a ferromagnetic metal or alloy is formed over the surface of such film, cracks tend to develop from the peaks of the projections. In the still-picture reproduction modes, the rotary magnetic heads tend to scratch the ferromagnetic thin film from its cracks and finally separate it from the base or substrate. As a result, the still-picture-reproducibility-life becomes very short. In addition, surface roughness cannot be reduced less than 0.1 $\mu$m in Rmax. Rmax is defined in JIS B0601-1976 or ISO R468-1966. It is rated as a value in $\mu$m obtained by dividing a maximum peak-to-valley distance over a reference length by a longitudinal magnification.

When thin films are formed over the smooth surfaces of polyester film bases or substrates free from such extremely fine projections as described above, friction between the cylinder of a rotary head assembly and a magnetic tape is so high that smooth transportation of the magnetic tape cannot be ensured.

The vacuum evaporation, ion-plating or sputtering method by which magnetic thin films are deposited in a vacuum is advantageous over the wet plating method in that uniform magnetic characteristics are ensured over a long length of magnetic recording media and no pollution problem arises from the disposal of wastes. However, when magnetic thin films are formed, film bases or substrates are subjected to heat in vacuum or at reduced pressures so that gases mainly consisting of water vapor and polyester oligomer evolve from the surfaces of the base or substrate. As a result, the magnetic and other characteristics of finished products are adversely affected. Water vapor can be removed by a pre-drying step, but it is difficult to eliminate polyester oligomers by a preliminary step.

SUMMARY OF THE INVENTION

The present invention overcomes the above and other problems encountered in the prior art magnetic recording medium.

A first object of the present invention is, therefore, to provide a metal thin-film type magnetic recording medium which has excellent magnetic characteristics and a long still-picture-reproducibility-life. (In the still-picture reproduction mode, a predetermined length of magnetic thin film is repetitively scanned many times by rotary heads at a high velocity.)

A second object of the present invention is to provide a metal thin-film type magnetic recording medium which has a long shelf life even at high temperatures and humidity.

A third object of the present invention is to provide a process for fabricating metal thin-film type magnetic recording media which have excellent magnetic characteristics and a long still-picture-reproducibility-life and a long shelf life even at high temperatures and humidity.

To the above and other ends, the present invention provides a magnetic recording medium characterized in that a ferromagnetic metal thin film containing oxygen is formed directly or through a nonmagnetic thin film containing oxygen over the surface of an elongated polyester film which is formed with worm-like or particle-like projections consisting of curved high-molecular weight compounds. In addition, the present invention provides a process for fabricating magnetic recording media characterized by forming, at a reduced pressure in an atmosphere containing oxygen, a ferromagnetic metal thin film over the front surface of an elongated polyester film whose front surface is formed with worm-like or particle-like projections consisting of cured high-molecular weight compounds and whose back surface is formed with worm-like or particle-like projections consisting of cured high-molecular weight compounds or whose back surface is coated with a thin film of resin dispersed with finely divided solid particles.

The above and other objects, effects and features of the present invention will become more apparent from the description of preferred embodiments thereof taken in conjunction with the accompanying drawings.

BRIEF DESCRIPTION OF THE DRAWINGS

FIG. 3 shows life characteristics of magnetic recording media in accordance with the present invention.

DESCRIPTION OF THE PREFERRED EMBODIMENTS

Bases which are preferred for the fabrication of coated type magnetic tapes are produced as follows. First, while a polyester film is being drawn, a resin emulsion containing a lubricant such as wax is applied to one or both of the smooth surfaces of the film. Thereafter, the film is heated so that cured polymeric structures are produced and the film is further drawn so that the surfaces thereof are imparted with extremely fine worm-like or particle-like projections. (See Japanese Laid Open Patent Application Nos. 84264/1977, 128683/1978 and 94574/1979 and U.S. Pat. No. 4,233,352.) The surface of the film with worm-like or particle-like projections is used as a back surface of a magnetic recording medium while the smooth surface (one of the surfaces when both have worm-like or particle-like projections) of the film is coated with a magnetic layer. The worm-like or particle-like projections mainly consist of fragments of thin film consisting of cured high-molecular weight compounds, but recesses are believed to be the polyester film itself. As a result, when a magnetic recording medium of the type in which a magnetic thin film is formed over the surface of the base with worm-like or particle-like projections is subjected to thermal or mechanical impacts, extremely fine cracks propagate along the boundaries between peaks and valleys. Crack spacing is small and the peaks are considered to be almost free from cracks. Therefore, it is apparent that such cracks will not adversely affect transportability and still-picture-reproducibility.

The length of a worm-like or particle-like projection or peak is preferably 0.1–50 $\mu$m and more preferably 0.1–5 $\mu$m; the width is preferably 0.1–10 $\mu$m and more preferably 0.1–3 $\mu$m; the height Rmax is preferably 0.005–0.3 $\mu$m and more preferably 0.005–0.05 $\mu$m; and the density (the number of projections or peaks per unit area) is preferably between $10^3$ and $10^7$ per mm$^2$ and more preferably between $10^4$ and $10^6$ per mm$^2$.

Figure 1:
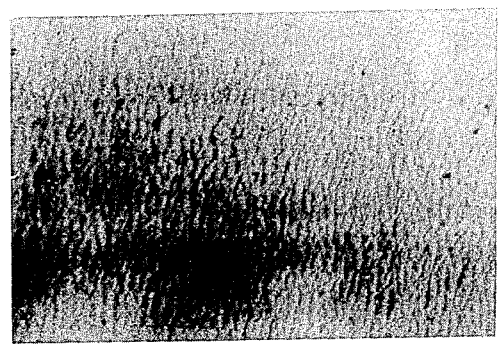
FIG. 1 is a micrograph showing the surface of a magnetic recording medium of the present invention.
Figure 2:
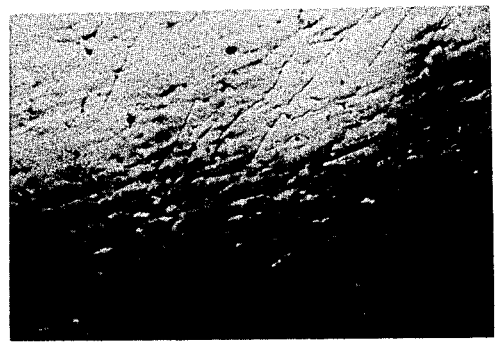
FIG. 2 is a micrograph showing the surface of a prior art magnetic recording medium.

FIG. 1 is a micrograph (500 magnifications) showing the surface of a magnetic recording medium in accordance with the present invention. FIG. 2 is a micrograph (500 magnifications) showing the surface of a magnetic recording medium consisting of a conventional polyester film and a magnetic thin film coated thereon. Stripes indicate cracks produced when each magnetic recording medium was heated under tension.

In order to impart surface roughness or irregularities to polyester films, there has been used a cured high-molecular weight compound with a large quantity of noncured lubricant such as natural or artificial wax. However, in order to attain the objects of the present invention, such lubricants are not preferred. According to the present invention it is preferred to use a cured high-molecular weight compound, if needed with a small amount of surface active agent and thickeners which are needed to improve the adhesive strength to polyester film or to coat a thin magnetic film over a polyester film. Cured high-molecular weight compounds used in the present invention are denatured silicon plastics or resins denatured with alcohols, epoxy, polyesters, polyethers, amines or melamines, epoxy resins, urethane resins, unsaturated polyester resins and their copolymers and mixtures. In general, these compounds are used in the form of an aqueous emulsion.

Preferred water-soluble high-molecular thickeners are hydroxyethyl cellulose, methyl cellulose, carboxylmethyl cellulose, polyvinyl alcohols, gelatin and so on.

A preferred polymerization catalyst is, for example, $MgCl_2$ for epoxy radicals.

These compounds are mixed with solvents, dispersants, additives, polymerization catalysts and thickeners to prepare an aqueous emulsion. The aqueous emulsion is then applied or coated over a monoaxially (longitudinally) drawn polyester film, which is as free from solid particles such as residual catalysts as possible, and dried and cured. The polyester film is then drawn laterally and, if needed, longitudinally again. Thus, an elongated polyester film used in the present invention is produced.

Surface roughness values of polyester films thus fabricated can be varied by controlling the thickness of a film of aqueous emulsion applied thereto. When used as the surface of a base upon which is coated a magnetic thin film, the surface roughness value Rmax must be between 0.003 and 0.1 $\mu$m.

The uncoated surface of the film can be so processed as to have desired properties, qualities and conditions. For instance, in the case of the fabrication of magnetic disks, uncoated surfaces must be smooth. In the case of fabrication magnetic tapes, it is preferable that the uncoated surfaces are also imparted with worm-like or particle-like projections consisting of cured high-molecular weight compounds as described above or are formed with a thin film of high-molecular weight compound containing a lubricant so that transportability of magnetic films can be improved. It is preferred that the uncoated surface have the roughness value of 0.01 and 1.0 $\mu$m in Rmax.

One of the features of the present invention resides in the fact that the adhesive strength to the base film of the magnetic thin film can be considerably improved and consequently the occurrence of cracks can be reduced to a minimum and, therefore, the still-picture-reproducibility-life can be increased. The adhesive strength is improved because the magnetic thin film or nonmagnetic thin film (undercoating) coated over the surface of the base film contains oxygen (that is, at least part of the structure is oxidized) and because of synergestic effects of the surface texture and extremely fine structures of the surface of polyester film. These and other advantageous properties of the present invention will be described in detail below in conjunction with the direct coating of ferromagnetic metal thin films over the surfaces of polyester film bases by the conventional vacuum evaporation technique.

In the case of deposition of thin films of ferromagnetic metals such as CO, Ni and Fe, thin films having a higher degree of coercive force and exhibiting a higher degree of resistance to corrosion can be obtained when a small volume of oxygen is introduced into a Bell jar of the like and the angle of vapor incidence is inclined at some angle. The deposited film consists of partially oxidized ferromagnetic metals and exhibits a strong adhesive strength to the base film as compared with the thin film deposited without introducing oxygen. Especially when polyester films of the type having worm-like or particle-like projections consisting of the cured high-molecular weight compounds over their surfaces as described previously, the adhesive strength between the thin film and the base film becomes high. In addition, because of microstructures of surfaces, synergestic effects can be obtained as described previously. As a result, still-picture-reproducibility-life can be increased. If it is only desired to increase the video output, it is preferable that the surfaces of recording media be as smooth as possible. However, the magnetic recording medium consisting of a base with smooth surfaces and a magnetic thin film deposited over one surface thereof has by far a shorter still-picture-reproducibility-life than the magnetic recording medium of the present invention. The causes of such difference in still-picture-reproducibility-life can be attributed to (1) the difference in real area of contact between a video head and a magnetic recording medium; (2) the difference in propagation of cracks in thin films of metal oxide; and (3) the difference in shock absorbing action (cushion) against the impact caused when the video head rotating at high speeds strikes against the magnetic thin film on a recording medium.

There has been devised and widely used a process for depositing nonmagnetic material such as aluminum, titanium or silicon over the surface of a base film in order to improve reproducibility of magnetic characteristics of the thin film of ferromagnetic metal oxide. In this case, if oxygen is introduced to the nonmagnetic thin film which is in contact with the base film, the adhesive strength can be considerably improved as compared to when no oxygen is introduced. Nonmagnetic thin films can be formed by sputtering techniques with $Al_2O_3$ or $SiO_2$ and they exhibit a high adhesive strength. The content of the oxygen is preferably higher than 3% and more preferably higher than 5% in atomic number ratio relative to a ferromagnetic or nonmagnetic metal adjacent to the surface of a base film as shown in FIG. 3.

The data shown in FIG. 3 were obtained by the measurements of still-picture-reproducibility-life of magnetic recording media or tapes of the type consisting of a polyester film with worm-like or particle-like projections formed on one or both surfaces thereof and consisting of cured high-molecular weight compounds and a thin film of Co—Ni alloy (the content of Ni being 25% by weight) when such magnetic tapes were played with a home video tape recorder. The process for providing such magnetic recording media or tapes is substantially similar to that of First Example to be described below. The solid-line curve in FIG. 3 shows the characteristic of the magnetic recording media or film consisting of a base film and a thin film of Co—Ni alloy directly deposited upon one surface of the base film while the dotted-line curve, the characteristic of a magnetic recording medium or tape consisting of a thin film of Co—Ni alloy over one surface of a base film through an undercoating of aluminum.

EXAMPLE 1

A monoaxially stretched polyethyleneterephthalate which is almost free from extremely fine particles such as residues of copolymerization catalysts is prepared. Epoxy denatured silicon emulsion and aqueous emulsion of a hardener containing a small amount of polyvinyl alcohol are applied over one surface of the film at the rate of 100 mg/m² as solid matter and over the other surface at the rate of 300 mg/m². After drying, the film is further laterally stretched three times the original width. Thereafter, the film is heated at 180°–200° C. Thus, the film prepared in this process becomes 12 μm in thickness and has worm-like projections over the surfaces thereof, the projections consisting of cured denatured silicon. The surface roughness values Rmax are 0.02 μm over the top surface and 0.07 μm over the bottom surface. In a vacuum containing only an extremely small amount of oxygen, the vapor or beam of Co—Ni alloy (the content of Ni being 20% by weight) is inclined at an angle to the film surface and made to continuously impinge against them so that a magnetic thin film 0.1 μm is deposited. The content of the oxygen in the deposited ferromagnetic thin film is 5% in atomic number ratio relative to the Co—Ni alloy. The sample prepared in this process is referred to as "sample A" while a sample prepared under the same conditions as described above except that the evaporation atmosphere contains no oxygen is referred to as "sample B". (The content of the oxygen is less than 1%.) A further sample C is prepared by depositing by the vacuum evaporation technique a thin film of aluminum about 200 Å in thickness over the surface of the polyester film of the type described and then depositing a thin film of Co—Ni alloy in vacuum introduced with an extremely small amount of oxygen with an inclined angle of vapor incidence. The sample C contains 4% of oxygen in its aluminum thin film. A further sample D is prepared by following the procedure of sample C except that no oxygen is introduced when an aluminum thin film is deposited. The sample D contains less than 1% of oxygen in its aluminum thin film. In addition, sample E is prepared as follows: First, as a base film, polyester films for the production of conventional magnetic films are prepared. (Its thickness is 12 μm and has the surface roughness value Rmax of 0.3 μm and has no coating.) In vacuum introduced with an extremely small amount of the oxygen, the Co—Ni alloy is deposited over the surface of the base film to the thickness of 0.1 μm with an inclined angle of vapor incidence. Furthermore, sample F is prepared as follows. By following the procedure of sample A, only the back surface of the film is imparted with worm-like projections but the top surface remains smooth. (It is 12 μm in thickness.) Over the smooth top surface of the film is deposited to the thickness of 0.1 μm a thin film of Co—Ni alloy (the Ni content being 20% by weight) containing 5% (atomic percent) of oxygen.

Samples A to F are cut into a predetermined length and prepared in the form of a cassette tape. Using a home video tape recorder, measurement of still life characteristic; that is, still-picture-reproducibility-life is made. The results are as follows:

|  | Life in min. |
| --- | --- |
| Sample A | 150 |
| Sample B | 25 |
| Sample C | 180 |
| Sample D | 30 |
| Sample E | 20 |

EXAMPLE 2

The polyester film as prepared in EXAMPLE 1 is used. Instead of epoxy-denatured silicon emulsion, a mixture of epoxy resin emulsion (epoxy equivalent is (1500–2500)), a hardener and a small amount of polyether silicon and polyvinyl alcohol as additives is used. In vacuum introduced with a small amount of oxygen, a thin film of pure cobalt is deposited. A sample whose magnetic thin film contains 10% of oxygen has a still-picture-reproducibility-life of 200 minutes, but a sample whose oxygen content in its magnetic film is less than 1% because no oxygen is introduced has a life of 30 minutes.

So far, the present invention has been described in conjunction with the increase in still-picture-reproducibility-life and will be described in conjunction with the improvement of the back-surface-texture of magnetic recording media.

In general, the back surface of the base film is preferably imparted with suitable roughness or irregularities prior to the deposition of a thin film of ferromagnetic metal by the vacuum evaporation technique. This is done in order to suppress transportability of the base film and inhibit the evaporation of polyester oligomer in the vacuum evaporation device and the ensure desired transportability of the finished product. When, as described previously, the surfaces of a base film are imparted or provided with worm-like or particle-like projections, the finished recording medium can have satisfactory fundamental requirements such as head-contactability, transportability and so on under normal conditions. However, when the magnetic recording medium is transported in the atmosphere of high humidity after it has been left for a long time at high temperatures and humidity, noise is produced when it makes contact with guide posts. In the worst case, "blocking" occurs between the front and back surfaces of the magnetic film when it is wound on a reel. In order to overcome this problem, the present invention proposes the following two countermeasures. A first countermeasure is to use a polyester film whose front surface has worm-like or particle-like projections of a cured high-molecular weight compound as described above and whose back surface is coated with a thin film of resin in which solid particles are dispersed. Because of these solid particles, the back surface is provided with extremely fine projections so that transportability can be improved. It follows, therefore, that it is preferable that solid particles themselves have lubricating properties. For instance, they are finely divided particles of Teflon, carbon fluoride, graphite, molybdenum bisulfide, etc. In addition, finely divided particles of, for instance, alumina, silic, titanium oxide, calcium carbonate, talc, carbon black, phthalocyanine, etc. which are normally used as organic and inorganic pigment, can be used. In the latter case, it is preferable that their particle size be less than 0.5 $\mu$m.

As resins in which are dispersed such finely divided particles, it is preferred to use cured highmolecular weight compounds as described previously; that is, silicon resins which are denatured with alcohol, epoxy, polyester, polyether, amines or melamines, epoxy resins, urethane resins, saturated or unsaturated polyester resins, cellulose resins, and their copolymers and mixtures. In addition, use is made of thermoplastic resins having a softening point less than 150° C. They are, for instance, polyester, polyamides, polyether, cellulose resins, etc. These resins are mixed with solvents, dispersants and, if needed, additives, polymerization catalysts, hardeners and so on to prepare coating solutions. While a polyester film is being stretched, a suitable solution is applied to the back surface thereof and then dried and hardened. When the solution is applied to a polyester film which is being monoaxially or longitudinally elongated, a thin film formed over the back surface can have worm-like or particle-like projections as in the case of the front surface. In this case, the back surface is made rough by fine solid particles distributed on a worm-like surface of the thin film.

It is preferable that the roughness value of the back surface be higher than that of the front surface and be 0.01–1.0 $\mu$m in Rmax. It is most ideal that finely divided solid particles are projected out of the thin film at an extremely high density, but they may be uneven to give suitable surface roughness.

The second countermeasure is to produce worm-like projections on both surfaces of a base film as described in conjunction with EXAMPLES 1 and 2. Thereafter, a magnetic thin film is deposited over the front surface and a thin film of resin containing a lubricant is formed over the back surface. A thin film of resin containing a lubricant can be coated over such a thin film of resin with dispersed solid particles as described previously.

It is preferred that the lubricant have such properties that when the magnetic tape is wound on a reel, part of the lubricant is transferred to the adjacent magnetic thin film so that "blocking" can be prevented and the friction between the magnetic head and the magnetic thin film can be reduced to prevent noise or squeaks. For instance, preferred lubricants are hydrocarbon wax, fatty acid esters, silicons, hydrocarbon fluorides, graphite, molybdenum dioxide, graphite fluoride and so on. Such lubricants are added to solutions of vinyl chloride resins, urethane resins, epoxy resins or ester resins, applied to the back surface of the base film with the front surface coated with a magnetic thin film and dried and hardened. In general, organic lubricants have a low-molecular weight and exhibit a high vapor pressure under reduced pressure so that it is preferred that the lubricating film be formed after the magnetic thin film has been formed under reduced pressure. The back surface of the base film which has been exposed to reduced pressures has more uniform wettability than before it was subjected to reduced pressures. As a result, the adhesive strength between the back surface of the base film and the thin film thereover becomes more stable. It is preferred that the lubricating film be 0.01–0.5 $\mu$m in thickness and the content of a lubricant in the thin film be 0.1–50% by volume.

EXAMPLE 3

A monoaxially elongated polyethyleneterephthalate film which is almost free from particles or copolymerization residues is prepared. Aqueous emulsion consisting of epoxy-denatured silicon emulsion and its hardener and a small amount of polyvinyl alcohol is applied to one surface of the film at the rate of 100 mg/m$^2$ and to the other surface at the rate of 300 mg/m$^2$. After drying, the film is further laterally elongated three times the original width and heated at 180°–200° C. Thus is prepared an elongated polyester film 12 $\mu$m in thickness with both the surfaces formed with worm-like projections consisting of cured denatured silicon. The surface roughness values of the front and back surfaces of the film are 0.02 $\mu$m and 0.07 $\mu$m in Rmax, respectively. A long length of such film is connected to a long length of polyester film for the production of conventional magnetic tapes (12 $\mu$m in thickness and surface roughness value Rmax of 0.3 $\mu$m). The film tape is then set in a vacuum evaporation apparatus. While it is advanced along a metal roll, the beam of cobalt vapor is made to impinge on it at an inclined angle in the presence of a small amount of the oxygen, whereby a cobalt thin film of the thickness of 0.1 $\mu$m is deposited. The degree of vacuum is $3 \times 10^{-5}$ torr which is lower than $5 \times 10^{-5}$ torr experienced when the conventional film tape is deposited with a magnetic thin film. This means that the formation of worm-like projections on both the surfaces of the polyester film tape of the present invention is very effective in suppressing "outgassing". The sample thus prepared is called sample G.

A solution is prepared by mixing 0.2 parts by weight of monoglyceride stearate, 0.5 parts by weight of copolymers of vinyl chloride and vinyl acetate and 100 parts by weight of a solvent mixture consisting of ethyl acetate and toluene. The solution is applied to the back surface of the sample G and dried. A sample prepared in this process is referred to as "sample H".

The samples G and H are then cut into a predetermined length and prepared in the form of a cassette tape. Using a home video tape recorder, the qualities of pictures reproduced from these sample tapes were evaluated. During the initial experimental stage at 25° C. and 75% in relative humidity, the images with satisfactory qualities were reproduced from both the samples G and H.

The samples G and H were then stored for one week at 40° C. and 90% relative humidity. The tests were made under the same conditions as described above. The images reproduced from the sample H were stable, but the images reproduced from the sample G were distorted and noise or squeaks were produced when in contact with the cylinder of a rotating head because of its poor transportability.

EXAMPLE 4

Instead of epoxy-denatured emulsion, epoxy resin emulsion (the equivalent molecular weight of the epoxy being 1500-2500) is used to prepare a coating emulsion together with a hardener and a small amount of polyether-denatured silicon and polyvinyl alcohol. A thin film of CoNi (the content of Ni is 20%) is formed. Epoxy resin is added with 2% by weight of polyether silicon to prepare epoxy resin which is curable by irradiation with ultraviolet rays. The resin is applied to the thickness of 0.1 $\mu$m over the back surface of the base film. The results or effects were substantially similar to those attained by EXAMPLE 3.

EXAMPLE 5

A monoaxially elongated polyethyleneterephthalate film, which is almost free from particles such as copolymerization catalyst residues is prepared. An aqueous emulsion is prepared by mixing epoxy-denatured silicon emulsion, a hardener therefor and a small amount of polyvinyl alcohol. The aqueous emulsion is then applied to the front surface of the film at the rate of 100 mg/m$^2$. 50 parts by weight of finely divided graphite particles based on 100 parts by weight of the resin was further added to the aqueous emulsion of the above-described compositions. This emulsion was applied to the back surface of the film at the rate of 400 mg/m$^2$ and dried and then laterally elongated three times the original width. Thereafter, the elongated film was heated at 180°-200° C. An elongated polyester film, was prepared by this process, of a thickness of 12 $\mu$m with the front surface formed with worm-like projections consisting of cured denatured silicon and the back surface formed also with worm-like projections consisting of cured denatured silicon and having graphite particles dispersed therein. The front surface had the roughness value of 0.02 $\mu$m and the back surface, the roughness value of 0.07 $\mu$m. A length of such film tape was connected to a length of conventional film tape used for the fabrication of magnetic tapes (12 $\mu$m in thickness and 0.3 $\mu$m in Rmax). The tape was passed into a vacuum evaporation apparatus. While it is transported along the surface of a metal roll, the beam of evaporated cobalt is made to impinge upon it at an inclined angle in the presence of a small amount of oxygen to deposit a cobalt thin film of 0.1 $\mu$m in thickness. The degree of vacuum is $3 \times 10^{-5}$ torr when the tape of the present invention was passing through the apparatus but it is $5 \times 10^{-5}$ torr when the conventional tape is being transported therethrough. Thus, as is the case of the EXAMPLE 4, it is apparent that the formation of worm-like projections over the both the surfaces of the tape is very effective in suppressing "degassing". The tape prepared in this process will be referred to as "sample I".

An aqueous emulsion was prepared by mixing epoxy-denatured silicon emulsion, a hardener therefor and a small amount of polyvinyl alcohol. The aqueous emulsion was applied to the front surface of the film at the rate of 100 mg/m$^2$ and to the back surface thereof at the rate of 300 mg/m$^2$. Thereafter, following the procedure of EXAMPLE 4, a film was prepared which will be referred to as "sample J".

A further sample K was prepared by following the procedure of sample J except that epoxy resin dispersed with titanium oxide (100 parts by weight of 100 parts by weight of epoxy resin) was applied to the back surface (with the surface roughness value of 0.07 $\mu$m while the surface roughness value of the front surface being 0.02 $\mu$m) of the film prior to the vacuum evaporation step, thereby forming a thin film 0.5 $\mu$m in thickness.

A still further sample L was prepared by applying to the back surface of the sample K a solution prepared by mixing 0.2 parts by weight of monoglyceride stearate and 0.5 by weight of copolymers of vinyl chloride and vinyl acetate with 100 parts by weight of solvent consisting of ethylene acetate and toluene and drying the film.

The samples I to L are cut into a predetermined length to prepare them in the form of a cassette tape. With a conventional home video tape recorder, the qualities of the images reproduced from respective sample tapes are evaluated. During the initial stage of experiments at 25° C. and 75% relative humidity, the images reproduced from all sample tapes are satisfactory in quality. After the sample tapes had been stored for one week at 40° C. and 90% relative humidity, they are tested under the same conditions. The images reproduced from the samples I, K and L were stable, but the images reproduced from the sample J were distorted and noise or squeaks were produced in contact with the cylinder of a rotating head assembly because of poor transportability of the sample J. When the samples I, K and L were tested at 30° C. and 80% in relative humidity with other conditions same as described above, the samples I and L were found satisfactory, but the sample K produces some noise or squeaks at time.

In summary, the present invention relates to a magnetic recording medium which is of the thin-film type, has a long still-picture-reproducibility-life (or still life) and exhibits a higher degree of resistance to humidity and a process for the fabrication of such magnetic recording medium. The present invention has high industrial advantages.

What is claimed is:

1. A magnetic recording medium characterized in that a thin film of ferromagnetic metal containing oxygen is formed over the surface of an elongated polyester film which is coated with worm-like or particle-like projections comprising a cured high-molecular weight compound having a surface roughness, $R_{max}$, of 0.003 to 0.1 micrometers and wherein the back surface of said film also has worm-like or particle-like projections comprising a cured high-molecular weight compound and is further formed with a thin film of a high-molecular weight compound containing a lubricant.

2. A magnetic recording medium as set forth in claim 1 further characterized in that
said thin film of ferromagnetic metal is formed over a nonmagnetic thin film which in turn is formed over the surface of said elongated polyester film and which contains oxygen.

3. A process for fabricating magnetic recording media characterized by the steps of
forming, in vacuum containing oxygen, a thin film of a ferromagnetic metal or alloy over the front surface of an elongated polyester film, the front surface thereof being coated with worm-like or particle-like projections comprising a cured high-molecular weight compound having a surface roughness, $R_{max}$, of 0.003 to 0.1 micrometers while the back surface thereof being coated with worm-like or particle-like projections comprising a cured high-molecular compound or with a thin film of a resin dispersed with finely divided solid particles.

4. A process for fabricating magnetic recording media as set forth in claim 3 further characterized by a step of, after said thin film or a ferromagnetic metal or alloy having been formed, forming a thin film of a high-molecular compound containing a lubricant over the back surface of said elongated polyester film.

5. A magnetic recording medium characterized in that a thin ferromagnetic metal film containing more than 3% oxygen, in terms of atomic ratio, is directly or through a thin non-magnetic film containing more than 3% oxygen, formed over the front surface of an elongated polyester film whose surface roughness is from 0.003 to 0.1 micrometers in terms of $R_{max}$ and whose front and back surfaces have worm-like or particle-like projections comprised of a cured high-molecular weight compound and wherein said back surface has a thin film of a high-molecular weight compound containing a lubricant.

* * * * *